United States Patent
Chari (10) Patent No.: US 12,437,671 B2
(45) Date of Patent: Oct. 7, 2025

(54) INTERACTIVE TACTILE GRAPHIC AND BRAILLE DISPLAY SYSTEM AND METHOD OF USE

(71) Applicant: Venkatesh R. Chari, North Andover, MA (US)

(72) Inventor: Venkatesh R. Chari, North Andover, MA (US)

( * ) Notice: Subject to any disclaimer, the term of this patent is extended or adjusted under 35 U.S.C. 154(b) by 54 days.

(21) Appl. No.: 18/184,365

(22) Filed: Mar. 15, 2023

(65) Prior Publication Data

US 2023/0360559 A1    Nov. 9, 2023

Related U.S. Application Data

(60) Provisional application No. 63/320,167, filed on Mar. 15, 2022.

(51) Int. Cl.
*G09B 21/00* (2006.01)
*G06F 3/01* (2006.01)

(52) U.S. Cl.
CPC .......... *G09B 21/004* (2013.01); *G06F 3/016* (2013.01); *G09B 21/006* (2013.01)

(58) Field of Classification Search
CPC ...... G09B 21/006; G09B 21/004; G06F 3/016
See application file for complete search history.

(56) References Cited

U.S. PATENT DOCUMENTS

| | | | |
|---|---|---|---|
| 6,509,892 B1 * | 1/2003 | Cooper | G09B 21/004 715/702 |
| 7,352,356 B2 * | 4/2008 | Roberts | G06F 3/014 345/173 |
| 9,142,143 B2 * | 9/2015 | Chari | G09B 21/004 |
| 9,183,689 B2 * | 11/2015 | Chari | G07D 7/128 |
| 9,916,008 B2 * | 3/2018 | Bostick | G09B 21/004 |
| 10,055,053 B2 * | 8/2018 | Klein | H04L 9/3231 |
| 10,096,264 B2 * | 10/2018 | Robinson | G06F 3/013 |
| 11,120,706 B2 * | 9/2021 | Khermayer | G09B 21/005 |
| 11,295,632 B2 * | 4/2022 | Greiner | G06F 3/016 |
| 11,510,817 B2 * | 11/2022 | Baudisch | G06F 3/011 |
| 11,625,145 B2 * | 4/2023 | Van Wiemeersch | G06F 3/03547 715/810 |

(Continued)

*Primary Examiner* — Xuan M Thai
*Assistant Examiner* — Sadaruz Zaman
(74) *Attorney, Agent, or Firm* — ArentFox Schiff LLP; Bruce D. Jobse (57) ABSTRACT

A system enables interactive real-time refreshable tactile graphics and braille together enabling blind or visually impaired users to experience and interact with graphics and visual events live and in three dimensions. The tactile graphic display can set each pin in an array of pins to different intermediate heights, enabling users to experience topographical maps and other graphical elements such as shades and color represented as varying heights of pins. The system can simultaneously display high quality of tactile graphics and braille while allowing direct interaction with all digital media—providing real-time refreshable graphics and text in braille. The touch capability of the system enable users to point to any text on the graphic display and have it be instantly rendered in braille on the braille display, thus creating completely new paradigms for reading and creating content. The system further allows continuous monitoring of the touch data in real-time and updating the braille display with any corresponding text.

30 Claims, 5 Drawing Sheets

(56) References Cited

U.S. PATENT DOCUMENTS

| | | | | |
|---|---|---|---|---|
| 2016/0224116 A1* | 8/2016 | Hagedorn | ................ | G06F 3/14 |
| 2018/0240363 A1* | 8/2018 | Vats | .................... | G06F 1/1637 |
| 2021/0295739 A1* | 9/2021 | Moon | ................ | G09B 21/004 |
| 2023/0360559 A1* | 11/2023 | Chari | .................. | G09B 21/004 |

* cited by examiner

Use case where the picture is marked up with label metadata

Figure 4

Use case where screen-reading software is used to read the contents of the computer or smartphone display

Figure 5

INTERACTIVE TACTILE GRAPHIC AND BRAILLE DISPLAY SYSTEM AND METHOD OF USE

FIELD OF THE INVENTION

The disclosure relates generally to systems and methods for assisting the visually impaired and, particularly, to a device which enables real-time display of graphics and text for visually impaired users.

SUMMARY OF THE INVENTION

Disclosed is a device that enables interactive, real-time refreshable tactile graphics and braille together in a single device. The device comprises an interactive refreshable tactile graphics display enabling blind users to experience and interact with graphics and visual events live and in three dimensions. The device's graphic display has pins arranged in rows and columns to display graphics and a line of braille cells. The tactile graphic display has the unique ability to set each pin in an array of pins to different heights, enabling users to experience topographical maps and other graphical elements such as shades and color represented as varying heights of pins. With its touch interface, users can draw on the tactile display with their fingers, enabling true interactivity. The device can simultaneously display high quality of tactile graphics and braille while allowing direct interaction with all digital media—providing real-time refreshable graphics and text in braille. The touch capability of the device enables users to point to any text on the graphic display and have it be instantly rendered in braille on the braille display, thus creating completely new paradigms for reading and creating content. The device further allows continuous monitoring of the touch data in real-time and updating the braille display with any corresponding text. The concepts disclosed herein may also be used with tactile graphic displays in which the pins in the array are configurable to only two different heights.

The device can be used either standalone or connected to a computer, mobile device or other sources of graphics and text. In standalone mode, it is a fully self-contained content creation and consumption solution. In embodiments, the device comes with a reader and editor for braille and graphics files supporting numerous popular formats, and can also create and view graphics files with embedded braille labels that are activated by touch as the user explores the picture. When connected to a computer or smartphone, the device leverages the extensive screen-reader ecosystem to provide instant access to Windows, Mac OS, iOS, Android, Chrome OS, Fire OS and Linux systems, allowing users to interact with their favorite applications and software.

In accordance with one aspect of the disclosure, a method for use with a computer system having a refreshable tactile graphics display and a touch sensitive panel operatively couplable to a braille display, comprises: A) receiving touch data coordinates from the touch sensitive panel; B) applying any applicable offset and zoom compensation to touch data coordinates; C) looking up the compensated touch data coordinates in a table of text locations; D) translating to braille data any text data associated with a text located at the compensated touch data coordinates; and E) transmitting the braille data to a braille display. In embodiments, in place of or in addition to the translation in step D) above the text data may be forwarded to a speech synthesizer for generating audible output. In embodiments, the processor may disposed in the same or different device as the refreshable tactile graphics display and/or a touch sensitive panel, as long as the processor is interoperable therewith over an internal bus, networked node, or other network infrastructure.

In accordance with one aspect of the disclosure, a method for use with a computer system having a refreshable tactile graphics display and a touch sensitive panel operatively couplable to a braille display, comprises: A) receiving touch data coordinates from the touch sensitive panel; B) applying any applicable offset and zoom compensation to touch data coordinates; C) setting a reading cursor of a screen-reader application to the location of compensated touch data coordinates; D) translating to braille data any text data located at the compensated touch data coordinates; and E) transmitting the braille data to a braille display. In embodiments, the foregoing method may be embedded as computer readable instructions in a tangible medium for use with a computer system. In embodiments, in place of or in addition to the translation in step D) above the text data may be forwarded to a speech synthesizer for generating audible output.

In accordance with a further embodiment, a system comprises: a processor; a refreshable tactile graphics display operatively coupled to the processor; and a touch sensitive panel operatively couplable to the refreshable tactile graphics display and the processor; wherein the processor is configured for performing a method comprising: A) receiving touch data coordinates from the touch sensitive panel; B) applying any applicable offset and zoom compensation to touch data coordinates; C) looking up the compensated touch data coordinates in a table of text locations; D) translating to braille data any text data associated with a text located at the compensated touch data coordinates; and E) transmitting the braille data to a braille display.

In accordance with a still further embodiment, a system comprises: a processor; a refreshable tactile graphics display operatively coupled to the processor; and a touch sensitive panel operatively couplable to the refreshable tactile graphics display and the processor; wherein the processor is configured for performing a method comprising: A) receiving touch data coordinates from the touch sensitive panel; B) applying any applicable offset and zoom compensation to touch data coordinates; C) setting a reading cursor of a screen-reader application executing on the processor to the location of the compensated touch data coordinates; D) translating to braille data any text data located at the compensated touch data coordinates; and E) transmitting the braille data to a braille display.

The intent of this summary may not to be a comprehensive description of the claimed subject matter, but rather to provide a short overview of some of the subject matter's functionality. Other systems, methods, features, and advantages here provided will become apparent to one with skill in the art upon examination of the following Figures and detailed description. It is intended that all such additional systems, methods, features, and advantages be included within this description, be within the scope of the accompanying claims. In embodiments, the foregoing method may be embedded as computer readable instructions in a tangible medium for use with a computer system.

BRIEF DESCRIPTION OF THE DRAWINGS

The present methods and are illustrated by way of example, and not by way of limitation, in figures of the accompanying drawings and in which like reference numerals refer to similar elements and in which.

DETAILED DESCRIPTION OF THE INVENTION

Embodiments of the present disclosure are illustrated in the Figures, like numerals being used to refer to like and corresponding parts of the various drawings. Any embodiment or implementation of the present subject matter described herein is not necessarily to be construed as preferred or advantageous over other embodiments. In the following description, for the purposes of explanation, numerous specific details are set forth to provide a thorough understanding of the present embodiments. It will be apparent, however, to one skilled in the art that the present embodiments may be practiced without these specific details. In other instances, well-known structures and devices are shown in block diagram form in order to avoid unnecessarily obscuring the present embodiments.

Figure 1:
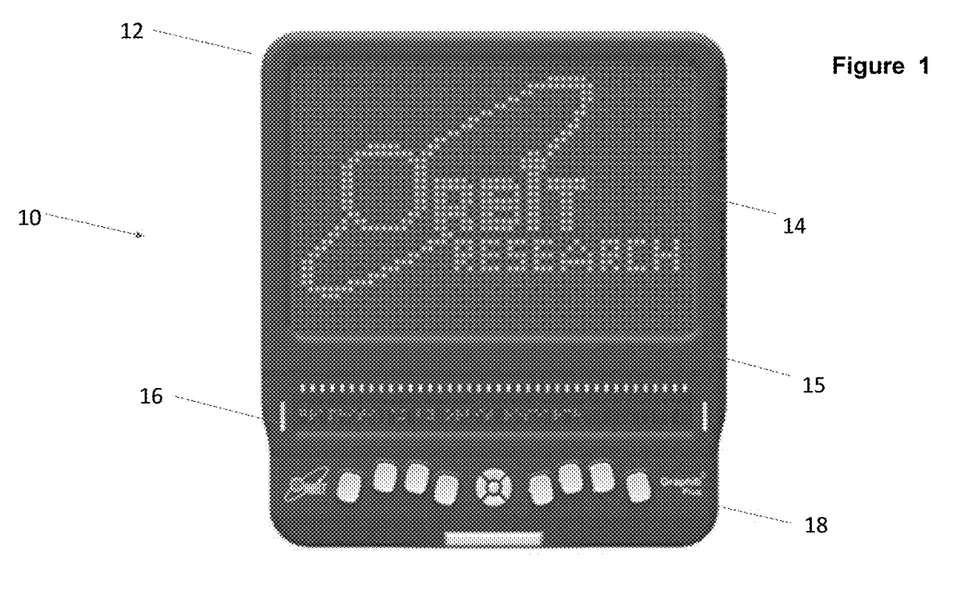
FIG. 1 illustrates conceptually a top plan view of the device in accordance with the disclosure.
Figure 2:
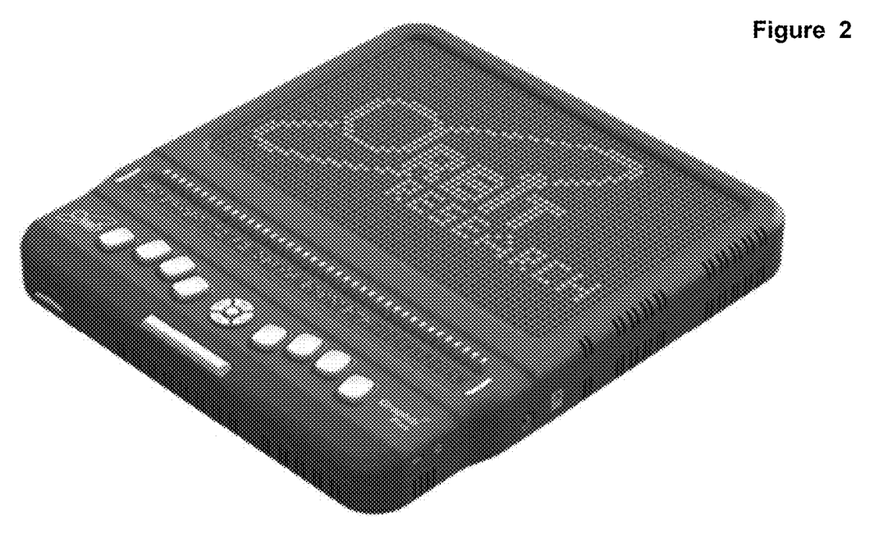
FIG. 2 illustrates a perspective view of the device of FIG. 1 in accordance with the disclosure.

FIG. 1 illustrates conceptually a top plan view of a device 10 in accordance with the disclosure. Device 10 comprises a housing 15 encompassing a processor 20, a tactile graphic display 12 having an overlying touch panel 14, a braille display 16 and a keyboard 18. In embodiments, housing 15 may be made of a substantially rigid material such as plastic or other materials and may have a substantially rectangular product profile without sharp corners to help absorb potential impacts, as illustrated in FIG. 1. FIG. 2 illustrates a perspective view of the device 10.

In embodiments, the tactile graphic display 12 comprises a 60×40 array of 2400 independently refreshable pins each having independently variable pin heights to provide the ability to present additional information such as color in three dimensions. The graphic display 12 allows content to be displayed in either portrait and landscape orientation. The tactile graphic display 12 is connectable to instruments, including computers, microscopes, telescopes, or video cameras for real time depiction of dynamic content.

The graphic display 12 further comprises a touch-sensitive panel 14 on the surface thereof that allows the device 10 to detect the position of one or more fingers or a stylus and allows drawing and gestures. In embodiments, touch-sensitive panel 14 is disposed between and among the pins of the array of graphic display 12. In embodiments, the touch-sensitive panel 14 comprises a plurality of electrodes with holes, each of which can accommodate a pin for upward and downward movement therethrough. When the pins are in their lowest position, they do not protrude beyond the surface of the panel 14. When the pins are in upper positions, at one of many possible levels, the pins protrude beyond the surface of the touch panel 14. In embodiments, the electrodes sense capacitance of an object or finger and/or the position/height of pin(s) to generate a data coordinates and other non-coordinate data. The touch-sensitive panel 14 allows users to control their computers or mobile devices or any other device or instrument. Users can create graphics by simply drawing with a finger or create text by simply typing on the Perkins-style braille keyboard 18. Users may also use finger gestures to perform other operations such as panning, zooming, centering and combinations of these operations. The system and methods disclosed herein may also be used with a tactile graphic display 12 in which the pins in the array are configurable in only two different heights.

In embodiments, braille display 16 comprises a line of refreshable braille cells, of arbitrary size (typically 20 or 40 cells). However, the concept also applies to a braille display that is physically a separate device from the tactile graphic display 12. In embodiments, panning control rocker keys may be disposed at each end of the braille display 16. In embodiments, the refreshable braille cells may also be implemented as a portion, typically on the bottom of touch panel 14 and graphic display 12. In other embodiments, text data result using the process flow as described in FIGS. 3 and 4 herein may be provided to a separate braille display operatively coupled to device 10 via a physical or wireless network.

In embodiments, the graphic display 12 may be implemented with an array of equidistant pins which form a tactile graphic displays. The pitch, i.e. the distance from pin center to pin center, may be larger than standard braille displays. For example, the pitch of the graphic array 12 may be 4 mm in both X and Y dimensions. The pitch of the pins in the braille display may 2.5 mm within the same braille cell, with a braille cell capable of communicating alphanumeric information being 8 pins arranged in 2 columns and 4 rows, with wider spacing between different cells. It is contemplated that the disclosed system and methods may be used with a graphic display 12 and a braille display 16 having any respective pin pitch resolutions.

The keyboard 18 may comprise a braille keyboard or other type of keyboard for entry of text and commands. In embodiments, keyboard 18 may be implemented with Perkins-style 8-key braille keyboard and may further comprises a cursor pad with 4-way arrows and select key for easy navigation.

Figure 3:
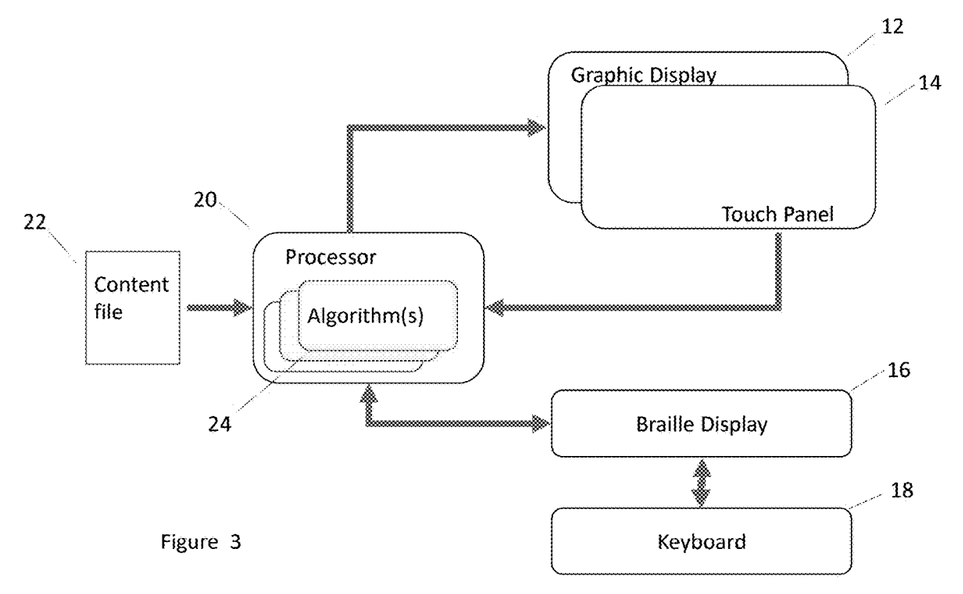
FIG. 3 illustrates conceptually a block diagram of select system elements and their respective interoperability provided in accordance with the disclosure.

FIG. 3 illustrates conceptually a block diagram of select system elements and their respective interoperability. As shown, each of graphic display 12, touch panel 14, braille display 16 and keyboard 18 are coupled to processor 20. Note, keyboard 18 may be operatively coupled to processor 20 through braille display 16 or directly to processor 20 (not shown). Processor 20 as illustrated may comprise its own onboard memory or have associated therewith RAM or ROM memories in which operating system and one or more algorithmic applications 24 may be stored. In embodiments, the device utilizes the Linux operating system and enables third-party developers to create new applications for the device. In FIG. 3, content file 22 provides the source of graphic and text content from local memory or an external source. In embodiments, the device 10 may have additional onboard applications such as Clock, Alarm, Calendar, and Calculator applications, etc. In FIG. 3, although braille display 16 is illustrated as a separate interface on device 10, braille data may also be displayed on the pin array of graphic display 12 if the array or a portion thereof it has high enough resolution to emulate braille cells. Alternatively, braille display 16 may be external to device 10 but operatively connected thereto over a network connection.

In embodiments, device 10 may include one or more external ports, not shown in FIG. 3, within housing 15 to enable connections to any computer or mobile device via USB, Bluetooth, WiFi, or as a monitor through HDMI or other video connection format. As such, the graphic display 15 can show any kind of graphical content, either read from a file or transmitted from an external, source such as a computer or smartphone. In embodiments, device 10 may include external USB Host Port for Mass Storage (USB Drive) or memory storage device port such as an SD card. In operational modes, the disclosed device 10 enables a user to view, create and edit any image and save to SD card, USB drive or connected devices. In a Braille display operational mode a user may connect to computers and mobile devices over USB or Bluetooth in order to access display content.

In embodiments, the device 10 allows users to share images in real time with other connected similar devices or remote devices. The device 10 may further comprise a mechanism for providing haptic (vibratory) and auditory feedback to the user. In embodiments, the device 10 may operate from a user-replaceable or rechargeable battery or with AC adaptor.

Method of Use

Figure 4:
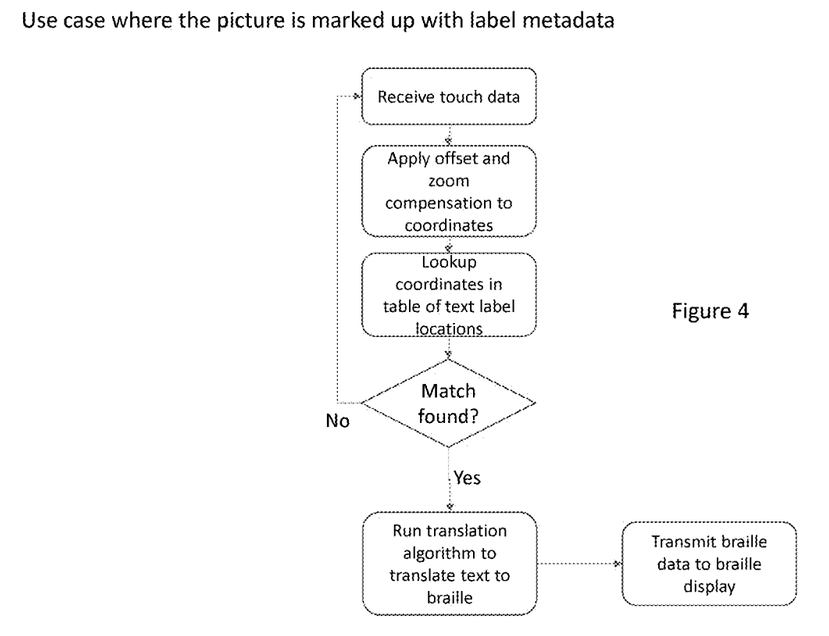
FIG. 4 illustrates conceptually process flow of an exemplary method for converting selected text within a graphic marked up with metadata.

FIG. 4 illustrates conceptually the process flow of an exemplary method for converting selected text within a graphic marked up with metadata. To begin, when the user touches any part of the graphic display 12 touch panel 14, the coordinates are transmitted to a processing unit, such as processor 20 in the device 10, or on a network connected device such as a laptop, PC, smartphone or tablet. Other information such as pressure of the touch and gesture information such as single or double taps, number of touch contact points, etc., may also be transmitted. The processor 20 contains one or more software algorithms 24 that correlate the coordinates and other information to the content that is being displayed on the graphic display 12. Such correlation algorithms may include application of any offset and zoom compensation to received coordinates since the graphic display may be zoomed in and/or panned. Next, the processor looks up the compensated coordinates in a table of text locations associated with the file content. If the coordinates point to a location in the displayed content where there is text, e.g. a web page with graphics and/or text, a text label or a text containing document, the corresponding text is translated to braille data and sent to the braille display 16. The text data may also be sent un-translated and the translation performed into braille on the braille display 16. In embodiments, in addition to the braille display, the text data may also be sent un-translated to a speech synthesizer algorithm executing on processor 20 within device 10 or to similar external functionality for translation of the text data into audible speech. Any number of commercially available text to speech synthesizer algorithms may be used for such implementation. In embodiments, the located text data may be forwarded to a speech synthesizer for generating audible output in place of translation to braille data and transmission to Braille display 16. The software algorithms 24 may also generate haptic (vibration) and/or audio feedback indicating the presence of text at the point being touched. In addition, the information received from the touch panel 14 such as pressure, gestures, and number of touch contact points may also be used by the algorithms 24 to trigger an action such as displaying a different portion of the picture, changing the zoom and pan settings, centering the picture and loading other content (file).

The braille display 16 creates in braille the text at the location on the graphic display 12 that the user is touching, thereby allowing seamless interaction with content that includes graphics and text. In this manner, a user can visualize the overall layout of a document or webpage or even a computer desktop and then read in braille the text at any location simply by touching the graphic display 12.

Figure 5:
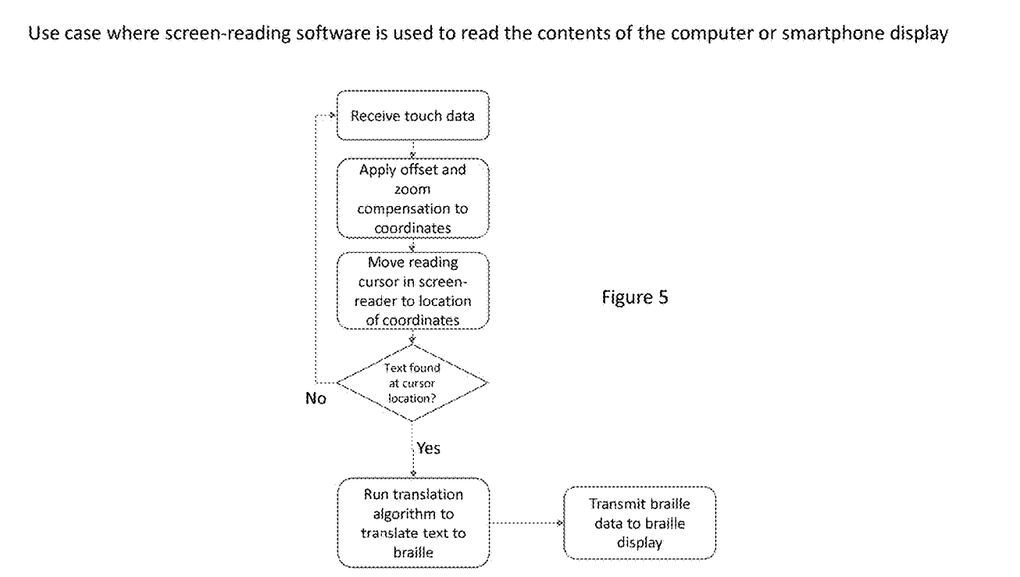
FIG. 5 illustrates conceptually process flow of an exemplary method for converting selected text within a graphic using screen-reading software to read the contents of the computer or smartphone display.

FIG. 5 illustrates conceptually the process flow of an exemplary method for converting selected text within a graphic using screen-reading software to read the contents of the computer or smartphone display. The processor 20 similarly correlates the coordinates and other information to the content that is being displayed on the graphic display 12 similar to that described above. In this instance, the computer's processor moves the reading cursor of the screen-reader application to the location of the compensated coordinates. If text is found at the cursor location, the corresponding text is translated to braille data and sent to the braille display 16. The text data may also be sent un-translated and the translation performed into braille on the braille display 16, or to a speech synthesizer in place of, or in addition to, the braille display 16, similar to the process described with reference to FIG. 4. In embodiments, device 10 is compatible with all popular screen readers on Windows, Mac OS, iOS, Android, Fire OS, Chrome OS, Linux and other platforms.

The above described system and technique may also be utilized with documents containing graphic content marked with alternative text. Alternative text (Alt text) is a word or phrase that can be inserted as an attribute in an HTML (Hypertext Markup Language) document to tell Web site viewers the nature or contents of an image. Alt text is useful when an image link is not available because of a broken or changed URL or some other issue. But for people with visual impairments, alt-text is commonly used to provide a description of the graphic object. When a graphic object has "ALT-text" associated with the graphic object, touching such an object (using a touch panel or other means) would send the ALT-text to the braille display 16 after being translated in a manner similar to that described above or sent un-translated to a speech synthesizer in place of or in addition to the braille display 16.

The device 10 may also be used for creating and editing documents containing text and/or graphics where the touch panel 14 may be used to control the location of a cursor, and the braille display 16, coupled with a braille keyboard 18 or a regular keyboard may be used to insert or edit the text at the identified location.

According to another aspect of the disclosure, the content file(s) 22, in embodiments, may have a file format that includes the ability to store text and/or braille label information in the meta-data fields of the file format. Such a format could reduce or eliminate the steps necessary to resolve the touch panel coordinates into braille data for display or conversion to speech. In embodiments, the file format defines multiple data constructs enabling fields associated with a file to contain the following information and attributes:

The coordinates of the text or tag, potentially in three dimensions for a universal format which would also account for 3D A time element, which could tell the processor if a label should be active only at certain times after the graphic is started to be viewed, or relative to other events, and if the label should deactivate at a certain time The actual text of the label—either untranslated or translated to braille If the label is in braille data, the braille data could be in a contracted or uncontracted format. The text can be in any language. Both the contraction level as well as the language would be captured in attributes.

Attributes indicating whether the label text should ONLY be sent to the braille display, or to the speech synthesizer or to any other destination also

- Attributes indicating whether any audio or haptic or other cues should be presented when touch is sensed at the coordinates
- The coordinates may be a set of coordinates outlining a rectangular area or area of another shape. Touch would be detected within this area in order to present the label information.
- The label may be presented in braille symbols on the braille display or other type of display including tactile graphic display, and if the display permits, may be shown at a specified height. The attribute of height would therefore also be included in the metadata
- A "blinking" attribute which provides information about the frequency and duration of the blinking
- Attributes may be dynamically changeable by the processor, based on the user's interaction with the content, e.g. touching and activating one label may deactivate another label or may trigger a subsequent action such as displaying a different portion of the picture, changing the zoom and pan settings, centering the picture and loading other content (file)

In the disclosed file format, one or multiple of the above-described attributes may be included as part of the metadata associated with a particular file to reduce or eliminate steps necessary to resolve the touch panel coordinates into braille data for display or conversion to speech.

System and Network Architecture

Embodiments of the above-described device 10 and its functionality may be implemented in digital electronic circuitry, in computer hardware, firmware, software and combinations thereof. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program is provided in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus that can be implemented as special purpose logic circuitry. The circuitry can, for example, be a FPGA (field programmable gate array) and/or an ASIC (application specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

In addition, any one or more of the functions described herein can be performed on a single processor or multiple processors operatively at work together over public or private network infrastructures. Similarly, any particular piece of data may be stored anywhere over a network infrastructure which is accessible by other routines or applications within the disclosed system.

The disclosed device 10 may be operatively coupled over a network infrastructure with any number of compatible devices including, but not limited to a desktop computer, a mobile device (e.g., cellular phone, personal digital assistant (PDA) device, laptop computer, electronic mail device), as well as another similar device 10, where the response to a touch on one of the devices 10 may be broadcast to all of the other such devices, allowing other users to also experience/read/view/hear the text associated with the touch location, in accordance with the methods and systems disclosed herein.

The reader will appreciate that the disclosed device enables a user to interact with graphics and text simultaneously on a computer or mobile device, read and edit documents, slides, spreadsheets, web pages and any other content, take notes and edit files in braille.

The terms comprise, include, and/or plural forms of each are open ended and include the listed parts and can include additional parts that are not listed. The term and/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

While the disclosure has been described with respect to a limited number of embodiments, those skilled in the art, having benefit of this disclosure, will appreciate that other embodiments may be devised which do not depart from the scope of the disclosure as disclosed herein. It should be understood that various changes, substitutions and alterations can be made hereto without departing from the spirit and scope of the disclosure as described by the appended claims.

What is claimed is:

1. A method for use with a computer system having a refreshable tactile graphics display and a touch sensitive panel operatively couplable to a braille display, the method comprising:
   A) receiving touch data coordinates from the touch sensitive panel;
   B) applying any applicable offset and zoom compensation to touch data coordinates;
   C) looking up the compensated touch data coordinates in a table of text locations;
   D) translating to braille data any text data and alt-text associated with text associated with the compensated touch data coordinates; and
   E) transmitting the braille data to a braille display.

2. The method of claim 1 further comprising:
   F) generating haptic or audio feedback indicating text data associated with the text.

3. The method of claim 1 further comprising:
   F) receiving non-coordinate, touch-related information from the touch sensitive panel.

4. The method of claim 3 wherein the touch-related information comprises any of pressure, gestures, or number of touch contact points sensed by the touch sensitive panel.

5. The method of claim 3 further comprising:
   G) modifying content displayed on the tactile graphics display in response to the received non-coordinate, touch-related information.

6. The method of claim 5 wherein modifying content displayed on the tactile graphics display comprises any of displaying a different content on the tactile graphics display, changing zoom and pan settings associated with content displayed on the tactile graphics display, centering content on the tactile graphics display, or loading other content for display on the tactile graphics display.

7. A computer program product for use with a computer system having a refreshable tactile graphics display and a touch sensitive panel operatively couplable to a braille display, the computer program product containing computer executable instructions embedded in a tangible medium which upon execution perform a method comprising:
   A) receiving touch data coordinates from the touch sensitive panel;
   B) applying any applicable offset and zoom compensation to touch data coordinates;
   C) looking up the compensated touch data coordinates in a table of text locations;
   D) translating to braille data any text data and alt-text associated with a text located at the compensated touch data coordinates; and
   E) transmitting the braille data to a braille display.

8. The computer program product of claim 7 further comprising:
   F) generating haptic or audio feedback indicating text data associated with the text.

9. The computer program product of claim 7 further comprising:
   F) receiving non-coordinate, touch-related information from the touch sensitive panel.

10. The computer program product of claim 9 wherein the touch-related information comprises any of pressure, gestures, or number of touch contact points sensed by the touch sensitive panel.

11. The computer program product of claim 9 further comprising:
   G) modifying content displayed on the tactile graphics display in response to the received non-coordinate, touch-related information.

12. The computer program product of claim 11 wherein modifying content displayed on the tactile graphics display comprises any of displaying a different content on the tactile graphics display, changing zoom and pan settings associated with content displayed on the tactile graphics display, centering content on the tactile graphics display, or loading other content for display on the tactile graphics display.

13. A system comprising:
   a processor;
   a refreshable tactile graphics display operatively coupled to the processor; and
   a touch sensitive panel operatively couplable to the refreshable tactile graphics display and the processor;
   wherein the processor is configured for performing a method comprising:
      A) receiving touch data coordinates from the touch sensitive panel;
      B) applying any applicable offset and zoom compensation to touch data coordinates;
      C) looking up the compensated touch data coordinates in a table of text locations;
      D) translating to braille data any text data and alt-text associated with a text located at the compensated touch data coordinates; and
      E) transmitting the braille data to a braille display.

14. The system of claim 13 further comprising:
   F) generating haptic or audio feedback indicating text data associated with the text.

15. The system of claim 13 further comprising:
   F) receiving non-coordinate, touch-related information from the touch sensitive panel.

16. The system of claim 15 wherein the touch-related information comprises any of pressure, gestures, or number of touch contact points sensed by the touch sensitive panel.

17. The system of claim 15 further comprising:
   G) modifying content displayed on the tactile graphics display in response to the received non-coordinate, touch-related information.

18. The system of claim 17 wherein modifying content displayed on the tactile graphics display comprises any of displaying a different content on the tactile graphics display, changing zoom and pan settings associated with content displayed on the tactile graphics display, centering content on the tactile graphics display, or loading other content for display on the tactile graphics display.

19. The system of claim 13 further comprising:
   a memory operatively coupled to the processor for storing data files having a file format defining multiple data constructs for storing attributes associated with text or a braille label.

20. The system of claim 19 wherein an attribute of the data file comprises three dimensional coordinates of the text.

21. The system of claim 19 wherein an attribute of the data file comprises a time element indicating if a text should be active only at certain times after graphic is started to be viewed, or relative to other events, or if the text should deactivate at a certain time.

22. The system of claim 19 wherein an attribute of the data file comprises text or alt-text in either untranslated form or translated to braille.

23. The system of claim 19 wherein an attribute of the data file comprises whether any braille data is in contracted or uncontracted format.

24. The system of claim 19 wherein an attribute of the data file comprises an identifier of a language and any contraction level of any braille data.

25. The system of claim 19 wherein an attribute of the data file comprises an indicator of whether the text is sent to the braille display, a speech synthesizer process or other destination.

26. The system of claim 19 wherein an attribute of the data file indicates whether any audio or haptic or other cues are presented when the coordinates are selected.

27. The system of claim 19 wherein an attribute of the data file identifies a set of coordinates outlining a rectangular area or other shaped within which text information would be presented if selected.

28. The system of claim 19 wherein an attribute of the data file identifies whether the text contents are presentable on the braille display, or the tactile graphic display, and a specified height pin height if allowable.

29. The system of claim 19 wherein an attribute of the data file identifies defines a frequency and a duration of a blinking characteristic of the text contents.

30. The system of claim 19 wherein an attribute of the data file identifies any attributes dynamically changeable by the processor.

* * * * *